United States Patent [19]

Kobayashi et al.

[11] Patent Number: 4,784,347
[45] Date of Patent: Nov. 15, 1988

[54] SLIDING MECHANISM FOR SPINNING REEL

[75] Inventors: Takehiro Kobayashi; Kikuo Tsunoda; Hideo Murakami, all of Hiroshima, Japan

[73] Assignee: Ryobi Ltd., Hiroshima, Japan

[21] Appl. No.: 155,850

[22] Filed: Feb. 16, 1988

[30] Foreign Application Priority Data

Feb. 16, 1987 [JP] Japan .............................. 62-21618[U]

[51] Int. Cl.$^4$ ............................................ A01K 89/01
[52] U.S. Cl. ..................... 242/84.21 R; 74/51
[58] Field of Search ............. 242/84.1 R, 84.2 R, 242/84.2 G, 84.21 R, 84.21 A, 84.4; 74/44, 51

[56] References Cited

U.S. PATENT DOCUMENTS

| | | | |
|---|---|---|---|
| 2,711,292 | 6/1955 | Taggart et al. | 242/84.21 A |
| 3,150,602 | 9/1964 | Tyree | 74/44 X |
| 3,946,963 | 3/1976 | Oberg | 242/84.21 R |
| 4,005,832 | 2/1977 | Yamazaki | 242/84.21 R |
| 4,138,897 | 2/1979 | Ross | 74/44 X |

FOREIGN PATENT DOCUMENTS 446806  2/1948  Canada .......... 242/84.21 R

Primary Examiner—Stuart S. Levy
Assistant Examiner—Joseph J. Hail, III
Attorney, Agent, or Firm—Finnegan, Henderson, Farabow, Garrett and Dunner

[57] ABSTRACT

The spinning reel of the present invention pertains to a sliding mechanism which allows for the reduction in size and weight of the reel and an increase in the reciprocation stroke of the spool without a decrease in the winding force of the reel on the turning force of the rotor. That is, the sliding pin of the invention is located closer to the master gear than the conventional sliding mechanism.

4 Claims, 3 Drawing Sheets

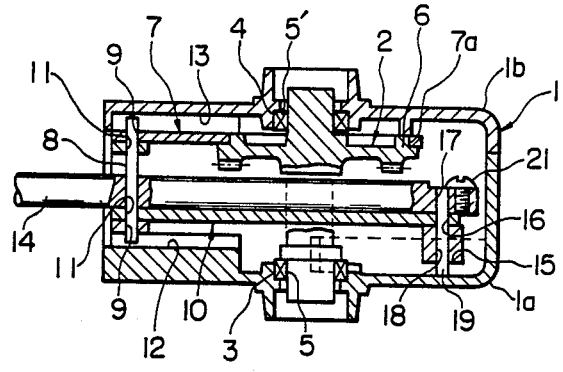
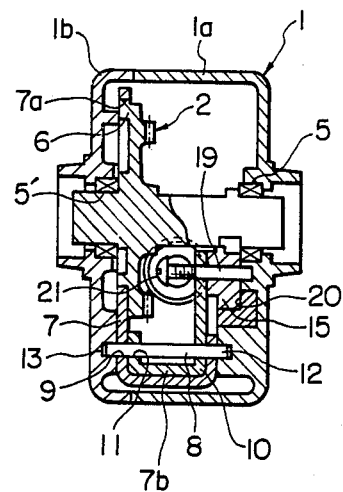
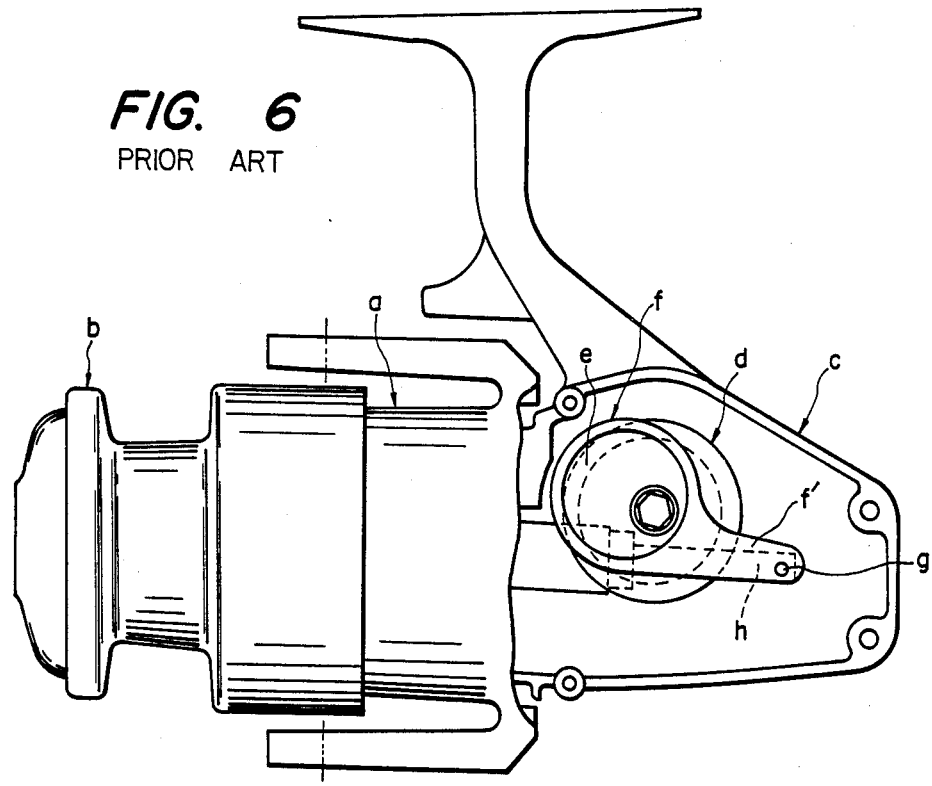

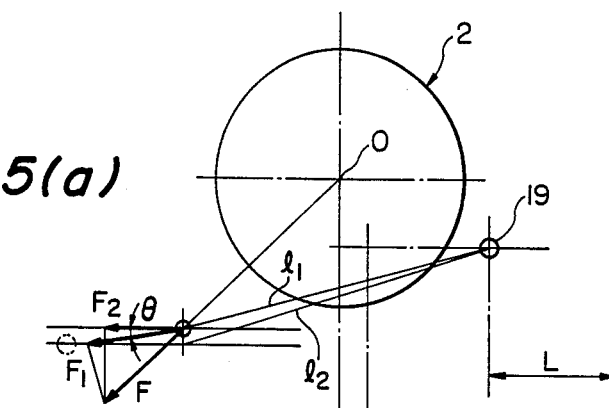
FIG. 5(a)
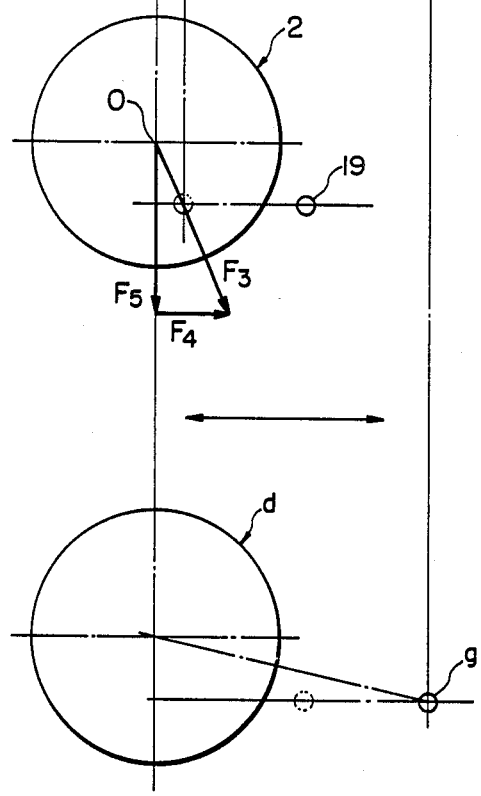
FIG. 5(b)
FIG. 5(c)

SLIDING MECHANISM FOR SPINNING REEL

FIELD OF THE INVENTION

The present invention relates to a reciprocative sliding mechanism for the spool of a spinning reel for fishing.

BACKGROUND OF THE INVENTION

Conventionally, in a closed spool type of spinning reel wherein a rotor is located in front of a spool, a slider pin for a slider can be located in front of the axis of a main gear to the spool, as disclosed in the Japanese Utility Model Application No. 31679/74.

In the Japanese Utility Model Application No. 28796/74, shown herein in FIG. 6, for example, rotor (a) is located behind a spool (b), close to body (c) and cannot be of a closed spool type. For that reason, a slider pin (g) is provided in the backwardly extending portion (f'), of a slider (f), rotatably fitted on the eccentric boss (e), of a master gear (d). The rear end or a main shaft (h) and a reciprocator (not shown in FIG. 6) are pivotally connected to the slider pin (g) in a swingable manner. The difficulty encountered with the conventional structure involves the ability to reduce the size and weight of the reel. That is, since the slider pin (g) is located behind the master gear (d) in the body (c) of the conventional spinning reel, it is necessary to increase the size of the reel body (c) in the front-to-rear direction.

SUMMARY OF THE INVENTION

An object of the present invention is to provide a spinning reel with a sliding mechanism.

Another object of the present invention is to overcome the problems and disadvantages of the prior art.

Accordingly, it is an object of the present invention to reduce the size and weight of the spinning reel and increase the reciprocation stroke of the spool without decreasing the winding force of the reel or the turning force of a rotor.

To achieve the above and other objects and in accordance with the purpose of the invention, as embodied and broadly described herein, a sliding mechanism for a spinning reel according to the present invention comprises a hollow body formed of a main part and a cover to which a spool is attached, a master gear including an axis having an eccentric boss affixed thereto within the body, a handle connected to the master gear to allow for rotation, a centrally-located main shaft, a pivotal coupler lever including a first and second end attached to the main shaft, a reciprocator pivotally connected to the pivotal coupler and the main shaft, sliding grooves provided in the main part and cover and inclined slightly in a downward fashion, a slider fitted on the eccentric boss via a slider pin located between the spool and the axis of the master gear, the slider pin for pivotally connecting the pivotal coupler lever to the slider and, being slidably fitted in the sliding grooves.

DESCRIPTION OF THE DRAWINGS

The accompany drawings, which are incorporated in and constitute a part of this specification, illustrate one embodiment of the invention and together with the description, serve to explain the principles of the invention.

FIG. 3 shows a sectional view of the sliding mechanism of FIG. 1 taken along line III—III;

FIG. 4 shows a sectional view of the sliding mechanism of FIG. 1 taken along line IV—IV;

FIGS. 5(a), 5(b) and 5(c) depict the operative principles of the sliding mechanism of the present invention and of a conventional sliding mechanism; and, FIG. 6 shows a partial, sectional side view of a conventional sliding mechanism.

DESCRIPTION OF THE PREFERRED EMBODIMENT

Figure 1:
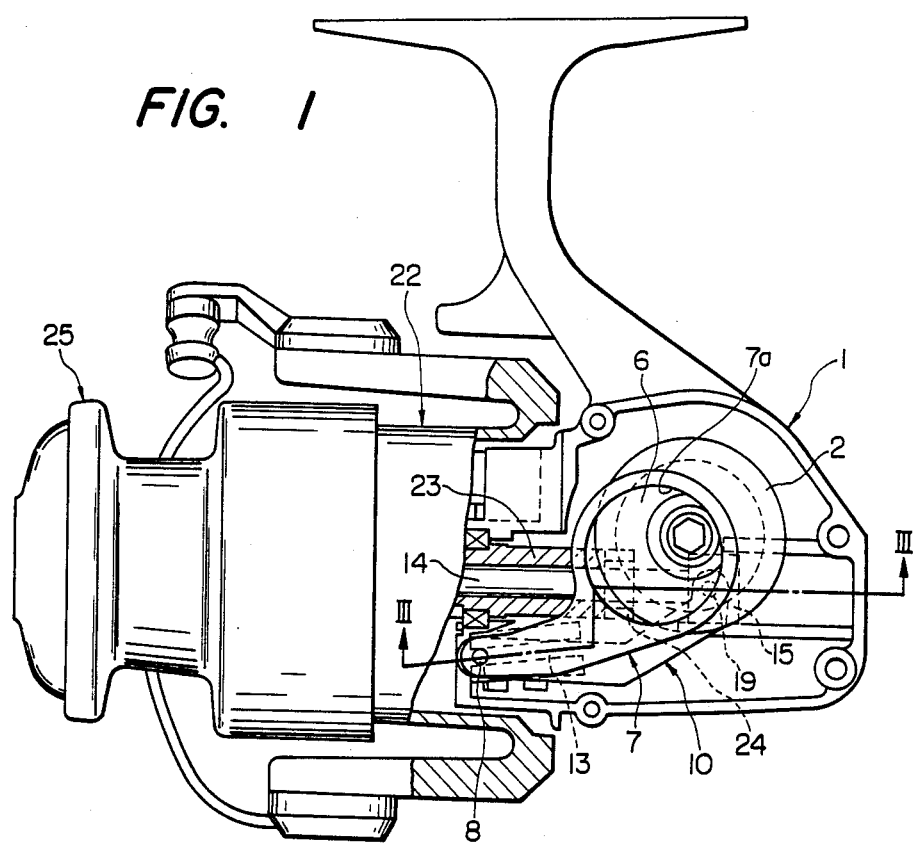
FIG. 1 shows a partial, sectional side view of an embodiment of a sliding mechanism for a spinning reel of the present invention.
Figure 2:
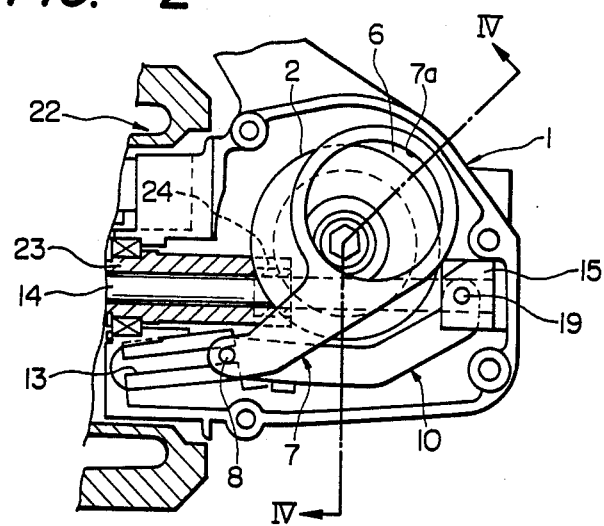
FIG. 2 shows a sectional view of a major part of the sliding mechanism of FIG. 1.

As shown in FIGS. 1 through 4, the reel body 1 of the spinning reel is hollow and comprises a main part 1a and a cover 1b secured to an open side portion of the main part by screws. FIGS. 1 and 2 indicate that a completely circular eccentric boss 6 is integrally provided on an untoothed side of a master gear 2.

As shown in FIGS. 3 and 4, a master gear 2 is provided in the reel body 1 and is supported by bearings 5 and 5' in bearing holes 3 and 4. As a result, the master gear may rotate in conjunction with the rotation of a handle (not shown in the drawings). The eccentric boss 6 is rotatably fitted in a butt hole 7a of a slider 7. A tip portion 7b of the slider 7 is U-shaped and contains opposite pin holes 9. The tip portion of a coupling lever 10 is also U-shaped and fits in the U-shaped tip portion 7b provided with opposite pin holes 11. A slider pin 8 extends through the pin holes 9 and 11 to connect the slider 7 and the coupling lever 10 to one another in a swingable manner as seen in FIG. 2. Both ends of the slider pin 8 are slidably fitted in parallel sliding grooves 12 and 13 which are located in the inside surfaces of the main part 1a and cover 1b and extend narrowly from the front-to-rear of the reel body.

The slider pin 8 is located in front of the axis 0 of the master gear 2, close to a spool 25, therefore, the sliding grooves 12 and 13 are located between the spool and the axis 0 or the master gear as shown in FIG. 1. Specifically, the sliding grooves 12 and 13, provided in the main part 1a and cover 1b of the reel body 1, are located in front of the axis 0 of the master gear 2, below the axis and extend at an incline either angularly or horizontally.

At the rear end portion of the coupling lever 10, a main shaft 14 is provided in the reel body 1 such that it can be reciprocated backwardly and forwardly. A reciprocator 15 having pin holes 16, 17 and 18 extending therethrough intersects the main shaft 14. A sliding pin 19 fits in pin holes 16, 17 and 18 in order to connect together the coupling lever 10, the main shaft 14 and the reciprocator 15 in a swingable manner. As shown in FIG. 4, the reciprocator 15 slidably fits in a groove 20 provided in the inside surface of the side wall of the main part 1a of the reel body 1 and extends narrowly from front-to-rear so that the reciprocator may slide backwardly and forwardly while being guided by the groove. A screw 21 engages the sliding pin 19 and the main shaft 14 as demonstrated in FIGS. 3 and 4.

FIG. 1 depicts a rotor 22 rotatably supported by a quill 23 in front of the reel body 1. On the inner end portion of the quill 23 a pinion 24 is provided and engages the master gear 6. Consequently, the rotor 22 is rotated in conjunction with the rotation of the handle.

The main shaft 14 extends through the quill 23. The spool 25 is secured to the front end of the main shaft 14.

As demonstrated in FIGS. 1 and 2, when the master gear 2 is rotated by operating the handle, the slider 7 and the slider pin 8 are guided by the sliding grooves 12 and 13 and move back and forth in relation to the quantity of the eccentricity of the eccentric boss 6. Thus, the main shaft 14 and the reciprocator 15 also move back and forth in continuity with one other through the action of the coupling lever 10 to reciprocate the spool 25.

The sliding mechanism of the present invention and a conventional sliding mechanism will now be described in comparison with each other with reference to FIGS. 5(a), 5(b), and 5(c), which show the operative principles of the sliding mechanisms. FIG. 5(a) depicts force $F_1$ which slides the spool 25 when the sliding grooves 12 and 13 are inclined and force $F_2$ which slides the spool when the sliding grooves are horizontal. The angle between $F_1$ and $F_2$ is represented by in FIG. 5(a). There is a correlation between the efficiency of winding or the turning force of the rotor and the angle That is, the efficiency of winding increases by the difference between the magnitudes of the forces $F_1$ l and $F_2$. As a result, it is preferable to place the sliding grooves 12 and 13 below the main shaft 14.

The length 1 of the coupling lever 10 in the case that the sliding grooves 12 and 13 are inclined can be made shorter than that 2 of the coupling lever in the case that the sliding grooves are horizontal, as shown in FIG. 5(a).

The invention herein takes advantage of the structural configuration wherein the sliding pin may be located within the outside diameter of the master gear 2. As shown in FIGS. 5(a) and 5(b), when the spool 25 is slid to its farthest, extended position the sliding pin 19 may be located within the outside diameter of the master gear 2. However, the sliding pin of the conventional sliding mechanism cannot be located within the outside diameter of the master gear 2 as demonstrated in FIG. 5(b). That is, if the sliding pin of the conventional sliding mechanism is located in the same position, as the sliding pin 19, a main shaft thrust force $F_5$, larger than the sliding force $F_4$, results such that the winding force or the turning force of a rotor decreases.

Clearly then, the sliding pin 19 of the sliding mechanism or the present invention may beneficially be located closer to the master gear 2, by a length L, than that of the conventional sliding mechanism, as seen in FIGS. 5(a) and (c), where the reciprocation stroke of the spool is identical for both the sliding mechanisms.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A sliding mechanism for a spinning reel comprising:
    a hollow body formed of a main part and a cover, said main part and said cover including narrowly extending sliding grooves;
    a master gear having an axis and an eccentric boss affixed thereto located within said body, said master gear being adapted to be rotated upon rotation of a handle of the reel;
    a main shaft centrally located in said hollow body;
    a spool attached to said main shaft;
    a pivotal coupler lever having first and second ends;
    a reciprocator having a first slider pin for swingably connecting said first end of said pivotal coupler lever and said main shaft;
    a slider having a first end connected to said eccentric boss and a second end; and
    a second slider pin located between said slider and said pivotal coupler lever for pivotally connecting said second end of said pivotal coupler lever to said second end of said slider, said second slider pin being slidably fitted in said sliding grooves.

2. A sliding mechanism according to claim 1, wherein said sliding grooves are each slightly inclined in a downward direction.

3. A sliding mechanism according to claim 1, wherein said sliding grooves each extend in a horizontal direction.

4. A sliding mechanism according to claim 1, wherein said second slider pin is located between said spool and said axis of said master gear.

* * * * *